United States Patent [19]

Miura et al.

[11] Patent Number: 4,511,402

[45] Date of Patent: Apr. 16, 1985

[54] SINTERED SILICON NITRIDE PRODUCTS AND PROCESSES FOR FABRICATION THEREOF

[75] Inventors: Kazunori Miura; Yoshinori Hattori; Yasushi Matsuo, all of Aichi, Japan

[73] Assignee: NGK Spark Plug Co., Ltd., Japan

[21] Appl. No.: 640,541

[22] Filed: Aug. 14, 1984

Related U.S. Application Data

[63] Continuation of Ser. No. 428,506, Sep. 29, 1982, abandoned.

[30] Foreign Application Priority Data

Sep. 30, 1981 [JP] Japan ................................ 56-155452

[51] Int. Cl.³ ............................................. C22C 29/00
[52] U.S. Cl. ...................................... 75/233; 264/65; 264/66; 419/10; 419/13; 419/19; 501/97; 501/98
[58] Field of Search .................... 75/233, 238; 264/65, 264/66; 419/10, 13, 19; 501/97, 98

[56] References Cited

U.S. PATENT DOCUMENTS 3,409,417 11/1968 Yates .................................... 75/238
3,950,464 4/1976 Masaki et al. ........................ 264/65

Primary Examiner—Leland A. Sebastian
Attorney, Agent, or Firm—Sughrue, Mion, Zinn, Macpeak, and Seas

[57] ABSTRACT

A sintered silicon nitride products and processes for the fabrication thereof are described, wherein the product comprises from 60 to 98.9% by weight of silicon nitride, from 0.1 to 15% by weight of one or more chromium components selected from metal chromium, chromium oxide, and chromium nitride, and from 1 to 25% by weight of one or more oxides selected from oxides of rare earth elements, scandium oxide, yttrium oxide, aluminum oxide, zirconium oxide and silicon dioxide.

14 Claims, No Drawings

SINTERED SILICON NITRIDE PRODUCTS AND PROCESSES FOR FABRICATION THEREOF

This application is a continuation of application Ser. No. 428,506, filed Sept. 29, 1982, now abandoned.

FIELD OF THE INVENTION

The present invention relates to sintered silicon nitride products having high mechanical strength, excellent oxidation resistance, and high density, and processes for fabrication thereof.

BACKGROUND OF THE INVENTION

Sintered silicon nitride products are excellent in various properties such as mechanical strength, heat and corrosion resistance, etc., and they are used as high temperature structural materials, such as for parts of gas turbines. However, silicon nitride has a poor sinterability because of its high covalent bond, and consequently, it is difficult to obtain sintered silicon nitride product having high density and high strength.

Hitherto, sintered silicon nitride products have been fabricated by (1) reaction sintering process which comprises molding and nitriding metallic silicon, (2) pressureless sintering process, and (3) hot-pressing process whose starting materials are silicon nitride powder containing sintering aids. However, these processes have advantages and disadvantages shown in the following Table 1.

TABLE 1

|  | Advantage | Disadvantage |
|---|---|---|
| (1) Reaction sintering process | Even complex sintered products can be fabricated. Degradation of strength hardly occurs, even at high temperatures. | Density is low, and strength, corrosion resistance, and oxidation resistance are inferior. |
| (2) Pressureless sintering process | It is possible to sinter even in the case of a product having a complicated shape, but not as complex as in (1). | Deformation is easily caused by shrinkage during sintering. The largest amount of sintering aids is required, and consequently degradation of strength is significant at high temperatures. Further, oxidation resistance is inferior. |
| (3) Hot-pressing process | Strength, oxidation resistance and corrosion resistance are excellent. | Only simple shaped sintered products can be obtained. Degradation of strength at high temperature is less than in pressureless sintering process because of lesser sintering aids. |

All of these processes have advantages and disadvantages. Therefore, none of them are completely satisfactory processes for fabricating high temperature structural materials having a complicated shape and good oxidation resistance, such as parts for gas turbines, engines, etc. However, since the pressureless sintering process and the hot-pressing process each has certain advantages, they would become desirable processes for fabricating the high temperature structural materials, if a method of overcoming the disadvantages while keeping the advantages of each could be found.

SUMMARY OF THE INVENTION

The present inventors have extensively studied the nature and functioning of sintering aids to be added in fabricating sintered products from silicon nitride or raw materials capable of forming silicon nitride by the pressureless sintering process, the hot-pressing process, or the reaction sintering process. As a result, it has now been found that sintered products prepared by adding as a sintering aids a combination of chromium components, including metallic chromium, and oxides, including oxides of rare earth elements, in a specified fraction to the silicon nitride content, have high density, excellent mechanical strength, and excellent oxidation resistance, and are suitable for high temperature structural components.

More particularly, the present invention relates to a sintered silicon nitride product formed by sintering a mixture comprising from 60 to 98.9% by weight of silicon nitride, from 0.1 to 15% by weight of one or more chromium components selected from metallic chromium, chromium oxide, and chromium nitride, and from 1 to 25% by weight of one or more oxides selected from oxides of rare earth elements, scandium oxide, yttrium oxide, aluminum oxide, zirconium oxide, and silicon dioxide, and to processes for fabrication thereof. The chromium components and oxides act as sintering aids according to the invention.

DETAILED DESCRIPTION OF THE INVENTION

The present invention is illustrated hereinafter in greater detail. In the sintered silicon nitride products of the present invention, it is highly preferred to add a chromium component selected from metallic chromium, chromium oxide and chromium nitride and an oxide selected from oxides of rare earth elements, scandium oxide, yttrium oxide, aluminum oxide, zirconium oxide and silicon dioxide, to the silicon nitride. By using a combination of both components as the sintering aids, sintered silicon nitride products having remarkably improved mechanical strength and oxidation resistance can be obtained as a result of unexpected synergistic effects of the sintering aids. Among the sintering aids, it appears as a result of studies by the present inventors that the chromium component contributes remarkably to improvement of the oxidation resistance of the resulting sintered silicon nitride products.

In the sintered silicon nitride products of the present invention, it is necessary that the chromium components as the sintering aids are added in a range of from 0.1 to 15% by weight based on the total weight including from 60 to 98.9% by weight of silicon nitride. If the chromium component content is greater than the above described range, although the resulting sintered products have high density, they have low mechanical strength and the oxidation resistance deteriorates, because the grain boundaries containing chromium are easily decomposed. On the contrary, if the amount is lower than the above described range, the density and mechanical strength are low, and an effect of oxidation resistance is not sufficiently exhibited.

Furthermore, it is necessary that the oxides in the sintering aids are added in a range of from 1 to 25% by weight based on the total weight including from 60 to 98.9% by weight of silicon nitride. If the oxide content is greater than the above described range, although the density is high, the mechanical strength is low and the oxidation resistance is inferior. On the contrary, if the amount is lower than the above described range, the density is low and the mechanical strength at high temperature deteriorates.

In order to obtain the sintered silicon nitride products of the present invention, fine grained chromium components and fine grained oxides are mixed as sintering aids with fine grained silicon nitride to form a mixture containing from 60% to 98.9% by weight of silicon nitride, from 0.1 to 15% by weight of the chromium components, and from 1 to 25% by weight of the oxides, by means of, for example, a ball mill to grind them, and the resulting mixture is molded in a desired shape under a pressure of about 2,000 kg/cm². Then, the moldings are sintered at a temperature of from 1,600° C. to 2,200° C. under a pressure of more than 1 atm in a nonoxidizing atmosphere such as nitrogen gas or nitrogen-containing gas.

It is desirable that the silicon nitride of the raw material contains 50% or more thereof in the α-phase, because sintering of silicon nitride is closely concerned with α-β phase transformation, and sintering does not proceed as well when the α-phase is less than 50%. Further, it is preferred that the particle size of silicon nitride is 10 microns or less in order to obtain desirable sintered products. Instead of silicon nitride powder compact as the starting material, it is possible to use a reaction-bonded silicon nitride product which is prepared from a raw material capable of forming silicon nitride such as metallic silicon powder, with the above described sintering aids, by sufficiently mixing them, molding the mixture, and reaction sintering at from 1,200° to 1,500° C. in a nitrogen atmosphere. In this process, the chromium components in the sintering aids accelerate the nitridation. As a result, it is possible to produce a dense product while reducing the amount of sintering aids, because the density before sintering is higher in the case of resintering the reaction-bonded product according to the present invention than in the case of molding $Si_3N_4$ powder together with sintering aids and sintering it. Furthermore, the resulting products have high oxidation resistance.

In the case of pressureless sintering, it is preferred to carry it out at a temperature in the range of from 1,600° to 1,900° C. If the sintering temperature is without the above described range, namely, lower than 1,600° C., sintered products with high density and mechanical strength cannot be obtained. If it is higher than 1,900° C., sintering cannot be achieved because silicon nitride itself decomposes significantly.

When sintering is carried out in a nitrogen atmosphere under pressure, sintered products having high density and high mechanical strength can be obtained. In this case, it is preferred to carry it out at a temperature in the range of from 1,600° to 2,200° C. under a pressure in the range of from 1 to 3,000 atm. If the pressure is lower than the above described range, the silicon nitride is easily decomposed when the temperature is higher than 1,900° C. If the pressure is higher than the above described range, the process is not suitable industrially from the viewpoint of safety and available apparatus.

If the temperature is lower than 1,600° C., sintered products having sufficient density and high mechanical strength cannot be obtained. If the temperature is higher than 2,200° C., the process is not suitable industrially from the viewpoint of available apparatus and safety.

In the case of carrying out sintering under a pressure of from 500 to 3,000 atm, although the moldings before sintering or the reaction sintered products may be sintered or resintered (in the case of using metallic silicon as a raw material) directly when they do not have opened pores, it is preferred to sinter them after covering the surface thereof completely with silica glass, etc., because there is the risk of preventing its densification if they are sintered directly in the case of having opened pores. Further, in case of sintering or resintering at a pressure of from 1 to 500 atm, sintering may be carried out without covering the surface, even if opened pores are present.

In the case of using metallic silicon as a raw material, the above described sintering step can be carried out continuously after the reaction sintering step.

The sintered silicon nitride products of the present invention obtained by the above described process, which comprises adding a combination of the above described chromium components and the oxides as sintering aids to silicon nitride or a raw material capable of forming silicon nitride in a specified fraction, molding the resulting mixture, and sintering under a pressure of not less than 1 atm, or resintering after nitriding, have high density and high mechanical strength, and are particularly excellent in oxidation resistance. Comparison of the sintered silicon nitride products of the present invention with sintered silicon nitride products outside the scope of the present invention is shown in Table 2 below, from which properties of the products of the present invention are clearly seen to be excellent.

TABLE 2

| | | Properties of Sintered Product*1 | | | |
| --- | --- | --- | --- | --- | --- |
| Composition of Mixture | Process for Sintering | Flexural Strength (kg/mm²) | Degradation of Strength after Oxidation (%) | Weight Gain of Samples after Oxidation (mg/cm²) | Remarks |
| $Si_3N_4$ and Sintering Aids | Pressureless or Pressing Sintering | 68–98 | 5–15 | 0.3–0.8 | The Present Invention |
| $Si_3N_4$ and Sintering Aids*2 | Pressureless or Pressing Sintering | 52–68 | 24–53 | 2.2–2.7 | Comparison |
| Si and Sintering Aids | Resintering after Nitriding | 68–103 | 4–10 | 0.2–0.8 | The Present Invention |
| Si and Sintering | Resintering after | 30–62 | 12–45 | 3.4–6.3 | Comparison |

TABLE 2-continued

| | | Properties of Sintered Product[*1] | | |
|---|---|---|---|---|
| Composition of Mixture | Process for Sintering | Flexural Strength (kg/mm$^2$) | Degradation of Strength after Oxidation (%) | Weight Gain of Samples after Oxidation (mg/cm$^2$) | Remarks |
| Aids[*3] | Nitriding | | | | |

[*1]The methods of measurement are described in the following Examples.
[*2]Fraction of chromium components is outside the range of the present invention but ratios of the other components are within the range of the present invention.
[*3]Fraction of oxides is outside the range of the present invention but ratios of the other components are within the range of the present invention.

The present invention, as described above, provides sintered products comprising silicon nitride and sintering aids consisting of a combination of the chromium components and the oxides in a specified fraction. These new sintered products of the present invention have high density, high mechanical strength and oxidation resistance, and they are suitable for use for parts of gas turbines or parts of engines, which require heat resistance and oxidation resistance.

In the following, the present invention is illustrated in greater detail by examples, but the present invention is not limited to the examples.

EXAMPLE 1

Silicon nitride was blended with chromium components and oxides as sintering aids (all having average particle sizes as shown in the following Table 3) so as to obtain sample compositions as shown in Table 4. After grinding by a ball mill, the mixture was molded under a pressure of 2,000 kg/cm$^2$ and sintered for 1 hour in a nonoxidizing atmosphere, under the conditions shown in Table 4. Flexural strength of the resulting sintered products was measured, and oxidation test was carried out and the degradation of strength after oxidation was measured. The results are shown in Table 4. The flexural strength was measured using a test sample of 4×8×25 mm (span 20 mm) according to JIS B-4104-1970. The oxidation test was carried out at 1,200° C. for 24 hours in air. Weight gain of samples after oxidation test [mg/cm$^2$] was calculated as $(W_2-W_1)/S$, wherein $W_1$ is the weight of the sample before oxidation test [mg], $W_2$ is the weight of the sample after oxidation test [mg] and S is the sample surface area [cm$^2$]. Further, degradation of strength after oxidation was calculated as $(\sigma OX-\sigma RT)/\sigma RT \times 100$ (%), wherein $\sigma RT$ is the flexural strength at room temperature, and $\sigma OX$ is the flexural strength at room temperature after oxidation.

TABLE 3

| Raw Material | Average Particle Size (μm) |
|---|---|
| Si$_3$N$_4$ | 1 |
| Cr$_2$O$_3$ | 3 |
| Cr | 7 |
| CrN | 3 |
| ZrO$_2$ | 3 |
| Al$_2$O$_3$ | 1 |
| SiO$_2$ | 1 |
| Y$_2$O$_3$ | 1 |
| CeO$_3$ | 2 |
| La$_2$O$_3$ | 2 |
| ScO$_2$ | 5 |

TABLE 4

| | | | | | | | | | | Properties of Sintered Product | | |
|---|---|---|---|---|---|---|---|---|---|---|---|---|
| Sample No. | Si$_3$N$_4$ Component (wt %) | Chromium Component (wt %) | | | Oxide | | Sintering Condition | | | Flexural Strength (kg/mm$^2$) | Degradation of Strength after Oxidation (%) | Weight Gain of Samples after Oxidation (mg/cm$^2$) |
| | | Cr$_2$O$_3$ | Cr | CrN | Material | Weight Fraction (wt %) | Temperature (°C.) | Pressure (atm) | Atmosphere | | | |
| 1 | 80 | 10 | — | — | ZrO$_2$ Al$_2$O$_3$ | 5 5 | 1,700 | 1 | N$_2$ | 71 | 12 | 0.7 |
| 2 | 80 | 10 | — | — | Al$_2$O$_3$ Y$_2$O$_3$ | 5 5 | 1,700 | 1 | N$_2$ | 83 | 10 | 0.5 |
| 3 | 80 | 8 | 2 | — | CeO$_2$ | 10 | 1,750 | 1 | N$_2$ | 72 | 8 | 0.4 |
| 4 | 80 | 8 | — | 2 | La$_2$O$_3$ | 10 | 1,750 | 1 | N$_2$ | 70 | 8 | 0.4 |
| 5 | 80 | 10 | — | — | SiO$_2$ ScO$_2$ | 5 5 | 1,700 | 1 | N$_2$ | 73 | 7 | 0.5 |
| 6 | 90 | 5 | — | — | ZrO$_2$ | 5 | 1,900 | 50 | N$_2$ | 98 | 6 | 0.3 |
| 7 | 96 | 2 | — | — | ZrO$_2$ | 2 | 2,100 | 2,000 | N$_2$/Ar(1/1) | 83 | 5 | 0.3 |
| 8 | 60 | 15 | — | — | CeO$_2$ Al$_2$O$_3$ | 20 5 | 1,850 | 20 | N$_2$ | 85 | 10 | 0.6 |
| 9* | 84.95 | 0.05 | — | — | ZrO$_2$ Al$_2$O$_3$ | 10 5 | 1,750 | 1 | N$_2$ | 68 | 24 | 2.7 |
| 10* | 60 | 10 | 10 | — | ZrO$_2$ Al$_2$O$_3$ | 10 10 | 1,750 | 1 | N$_2$ | 52 | 53 | 2.2 |
| 11 | 83 | — | 2 | — | CeO$_2$ | 15 | 1,750 | 1 | N$_2$ | 68 | 15 | 0.8 |
| 12 | 83 | — | — | 2 | CeO$_2$ | 15 | 1,750 | 1 | N$_2$ | 70 | 12 | 0.6 |
| 13* | 89.5 | 10 | — | — | CeO$_2$ | 0.5 | 1,750 | 1 | N$_2$ | 35 | 15 | 5.8 |
| 14* | 60 | 10 | — | — | CeO$_2$ Al$_2$O$_3$ | 20 10 | 1,750 | 1 | N$_2$ | 55 | 40 | 4.3 |

Note:
Symbol * means a comparative test.

EXAMPLE 2

Metallic silicon having an average particle size of 10 μm was used instead of the silicon nitride powder of Example 1 and sintering aids as indicated in Table 3 were used. After they were blended in the fraction shown in Table 5 and ground by a ball mill, the mixtures were molded under a pressure of 2,000 kg/cm². After carrying out a reaction sintering in a nitrogen gas containing atmosphere under a pressure of 1 atm at 1,400° C., the resulting reaction sintered product was resintered for 1 hour in a nonoxidizing atmosphere under the conditions shown in Table 5. The flexural strength of the resulting sintered products was measured by the same method as in Example 1, an oxidation test was carried out and the degradation of strength after oxidation was measured by the same method as in Example 1. The results are shown in Table 5.

TABLE 5

| No. | Si₃N₄ Component to be Converted from Si after Nitridation (wt %) | Chromium Component Cr₂O₃ | Chromium Component Cr | Chromium Component CrN | Oxide Material | Oxide Weight Fraction (wt %) | Reaction Sintered Product Degree of Nitridation (%) | Reaction Sintered Product Relative Density (%) | Sintering Condition Temperature (°C.) | Sintering Condition Pressure (atm) | Sintering Condition Atmosphere | Properties of Sintered Product Flexural Strength (kg/mm²) | Properties of Sintered Product Degradation of Strength after Oxidation (%) | Properties of Sintered Product Weight Gain of Samples after Oxidation (mg/cm²) |
|---|---|---|---|---|---|---|---|---|---|---|---|---|---|---|
| 15 | 90 | 6 | — | — | ZrO₂ | 4 | 90 | 75 | 1,750 | 1 | N₂ | 82 | 8 | 0.8 |
| 16 | 90 | 6 | — | — | Y₂O₃ | 4 | 92 | 75 | 1,750 | 1 | N₂ | 72 | 5 | 0.5 |
| 17 | 90 | 6 | — | — | Al₂O₃ Y₂O₃ | 2 2 | 91 | 76 | 1,750 | 1 | N₂ | 85 | 4 | 0.4 |
| 18 | 90 | 4 | 2 | — | CeO₂ | 4 | 93 | 77 | 1,750 | 1 | N₂ | 76 | 7 | 0.3 |
| 19 | 90 | 4 | — | 2 | La₂O₃ | 4 | 92 | 77 | 1,750 | 1 | N₂ | 68 | 10 | 0.3 |
| 20 | 90 | 6 | — | — | ScO₂ | 4 | 93 | 74 | 1,750 | 1 | N₂ | 73 | 5 | 0.6 |
| 21 | 95 | 3 | — | — | Y₂O₃ | 2 | 94 | 76 | 2,000 | 80 | N₂ | 103 | 4 | 0.2 |
| 22 | 98.9 | 0.1 | — | — | Al₂O₃ | 1 | 93 | 73 | 2,200 | 2,000 | N₂/Ar(1/1) | 86 | 9 | 0.3 |
| 23* | 93.5 | 6 | — | — | CeO₂ | 0.5 | 86 | 72 | 1,750 | 1 | N₂ | 30 | 12 | 6.3 |
| 24* | 64 | 6 | — | — | CeO₂ | 30 | 84 | 70 | 1,750 | 1 | N₂ | 62 | 45 | 3.4 |
| 25* | 95.95 | 0.05 | — | — | CeO₂ | 4 | 85 | 70 | 1,750 | 1 | N₂ | 65 | 30 | 3.0 |
| 26* | 76 | 10 | — | 10 | CeO₂ | 4 | 87 | 73 | 1,750 | 1 | N₂ | 62 | 44 | 2.5 |

Note:
Symbol * means a comparative example.

While the invention has been described in detail and with reference to specific embodiments thereof, it will be apparent to one skilled in the art that various changes and modifications can be made therein without departing from the spirit and scope thereof.

What is claimed is:

1. A sintered silicon nitride product formed by sintering a mixture consisting essentially of from 60 to 98.9% by weight of silicon nitride, from 0.1 to 15% by weight of one or more chromium components selected from metal chromium, chromium oxide, and chromium nitride, and from 1 to 25% by weight of one or more oxides selected from oxides of rare earth elements, scandium oxide, yttrium oxide, aluminum oxide, zirconium oxide and silicon dioxide.

2. A process for fabricating a sintered silicon nitride product comprising blending a mixture consisting essentially of from 60 to 98.9 parts by weight of silicon nitride with from 0.1 to 15 parts by weight of one or more chromium components selected from metallic chromium, chromium oxide, and chromium nitride, and from 1 to 25 parts by weight of one or more oxides selected from oxides of rare earth elements, scandium oxide, yttrium oxide, aluminum oxide, zirconium oxide and silicon dioxide, molding the resulting mixture, and sintering in a nonoxidizing atmosphere.

3. A process for fabricating a sintered silicon nitride product comprising blending a mixture consisting essentially of metallic silicon which is to be converted to silicon nitride after nitridation in an amount corresponding to from 60 to 98.9 parts by weight of silicon nitride with from 0.1 to 15% by weight of one or more chromium components selected from metallic chromium, chromium oxide, and chromium nitride, and from 1 to 25% by weight of one or more oxides selected from oxides of rare earth elements, scandium oxide, yttrium oxide, aluminum oxide, zirconium oxide and silicon dioxide, molding the resulting mixture, carrying out reaction sintering in a nitrogen atmosphere, and sintering thereafter in a nonoxidizing atmosphere.

4. The process of claim 2 wherein molding of the mixture is performed at a pressure of about 2,000 kg/cm².

5. The process of claim 2 wherein sintering is performed at a temperature of from 1,600° C. to 2,200° C. and a pressure of at least 1 atmosphere.

6. The process of claim 5 wherein sintering is performed at a pressure of from 1 to 3,000 atmospheres.

7. The process of claim 2 wherein the silicon nitride contains 50 percent or more of silicon nitride in the α-phase.

8. The process of claim 2 wherein the silicon nitride has a particle size of 10 microns or less.

9. The process of claim 3 wherein reaction sintering is carried out at from 1,200° C. to 1,500° C.

10. The process of claim 3 wherein the reaction sintered product is further sintered at a temperature of from 1,600° C. to 2,200° C. at a pressure of from 1 to 3000 atmospheres.

11. The process of claim 3 wherein molding of the mixture is performed at a pressure of about 2,000 kg/cm².

12. The process of claim 3 wherein the silicon nitride contains 50 percent or more of silicon nitride in the α-phase.

13. The process of claim 3 wherein the silicon nitride has a particle size of 10 microns or less.

14. The process of claim 2 wherein sintering is pressureless sintering carried out at a temperature of from 1,600° C. to 1,900° C.

* * * * *